US012785152B2

(12) United States Patent
Song et al.

(10) Patent No.: US 12,785,152 B2
(45) Date of Patent: Nov. 3, 2026

(54) ELECTRODE ASSEMBLY INCLUDING ADHESIVE LAYER OF ELECTRODE SMALLER THAN SEPARATOR, AND RECHARGEABLE LITHIUM BATTERY INCLUDING THE SAME

(71) Applicant: SAMSUNG SDI CO., LTD., Yongin-si (KR)

(72) Inventors: Hyo-jung Song, Yongin-si (KR); Kyoseon Koo, Yongin-si (KR); Minjae Kim, Yongin-si (KR); Junghyun Nam, Yongin-si (KR); Jeunggi Moon, Yongin-si (KR); Mihwa Yang, Yongin-si (KR); Duckjae You, Yongin-si (KR); Jinhee Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 689 days.

(21) Appl. No.: 17/966,593

(22) Filed: Oct. 14, 2022

(65) Prior Publication Data

US 2023/0122856 A1 Apr. 20, 2023

(30) Foreign Application Priority Data

Oct. 15, 2021 (KR) ........................ 10-2021-0137785

(51) Int. Cl.
*H01M 10/0583* (2010.01)
*H01M 10/0525* (2010.01)
*H01M 50/46* (2021.01)

(52) U.S. Cl.
CPC ... *H01M 10/0583* (2013.01); *H01M 10/0525* (2013.01); *H01M 50/461* (2021.01)

(58) Field of Classification Search
CPC ......... H01M 10/0583; H01M 10/0525; H01M 50/461
(Continued)

(56) References Cited

U.S. PATENT DOCUMENTS

2008/0280208 A1* 11/2008 Naoi ................ H01M 10/0583 429/247
2013/0011715 A1 1/2013 Lee et al.
(Continued)

FOREIGN PATENT DOCUMENTS

JP 2002015773 A * 1/2002
JP 2008-287925 A 11/2008
(Continued)

OTHER PUBLICATIONS

PSI Polymer Systems Inc., Mesh to Micron Conversion Table, 2020 (Year: 2020).*
(Continued)

*Primary Examiner* — Sean P Cullen
(74) *Attorney, Agent, or Firm* — Womble Bond Dickinson (US) LLP

(57) ABSTRACT

An electrode assembly and a rechargeable lithium battery including the same are disclosed herein. The electrode assembly includes an electrode and a separator, wherein the electrode includes a current collector, an electrode active material layer on the current collector, and an adhesive layer on the electrode active material layer; and wherein the separator has a larger surface area than the adhesive layer of the electrode; and a surface of the separator opposing the adhesive layer of the electrode is divided into an adhesive region in contact with the adhesive layer of the electrode and an overhang region not in contact with the adhesive layer of the electrode.

17 Claims, 7 Drawing Sheets

(58) Field of Classification Search
USPC .................................................. 429/144, 254
See application file for complete search history.

(56) References Cited

U.S. PATENT DOCUMENTS

| | | | | |
|---|---|---|---|---|
| 2015/0064547 | A1 | 3/2015 | Ahn et al. | |
| 2015/0140402 | A1* | 5/2015 | Kim | H01M 50/461 429/144 |
| 2015/0140403 | A1* | 5/2015 | Moon | H01M 10/058 429/144 |
| 2018/0309108 | A1* | 10/2018 | Shin | H01M 50/42 |
| 2018/0315971 | A1* | 11/2018 | Kwon | H01M 50/451 |
| 2020/0075910 | A1* | 3/2020 | Kim | H01M 10/052 |
| 2020/0127328 | A1* | 4/2020 | Lee | H01M 10/052 |
| 2020/0136190 | A1* | 4/2020 | Yamashita | H01M 10/0585 |
| 2022/0238961 | A1* | 7/2022 | Fukae | H01M 50/451 |
| 2022/0384854 | A1* | 12/2022 | Kawamura | H01M 50/489 |
| 2023/0031407 | A1* | 2/2023 | Kusada | H01M 10/052 |
| 2024/0297352 | A1* | 9/2024 | Iseda | H01M 50/417 |

FOREIGN PATENT DOCUMENTS

| | | | | |
|---|---|---|---|---|
| KR | 10-2015-0025420 | A | 3/2015 | |
| KR | 2015037078 | A * | 4/2015 | H01M 10/04 |
| KR | 10-2016-0051199 | A | 5/2016 | |
| WO | WO 2019-230219 | A1 | 12/2019 | |
| WO | WO-2021131878 | A1 * | 7/2021 | H01M 10/052 |

OTHER PUBLICATIONS

Extended European Search Report for Application No. 22201734.5, mailed Mar. 14, 2023, 7 pages.

Office Action issued Jan. 8, 2026 by the Ministry of Intellectual Property (Republic of Korea) for corresponding Korean Patent Application No. 10-2021-0137785, 6 pages.

* cited by examiner

ELECTRODE ASSEMBLY INCLUDING ADHESIVE LAYER OF ELECTRODE SMALLER THAN SEPARATOR, AND RECHARGEABLE LITHIUM BATTERY INCLUDING THE SAME

CROSS-REFERENCE TO RELATED APPLICATION

This application claims priority to and the benefit of Korean Patent Application No. 10-2021-0137785, filed in the Korean Intellectual Property Office on Oct. 15, 2021, the entire content of which is herein incorporated by reference.

BACKGROUND

1. Field

Embodiments of the present disclosure relate to an electrode assembly and a rechargeable lithium battery including the same.

2. Description of the Related Art

Portable information devices such as cell phones, laptops, smart phones, and/or the like or electric vehicles have utilized rechargeable lithium batteries having high energy densities and easy portability as driving power sources. Recently, research has been actively conducted to utilize rechargeable lithium batteries with high energy densities as driving power sources or power storage power sources for hybrid or electric vehicles. However, it is very difficult to maintain air permeability of the separator in an appropriate or suitable range while securing adherence between the electrode and the separator while driving a rechargeable lithium battery having a high energy density.

SUMMARY

Aspects of one or more embodiments of the present disclosure are directed towards an electrode assembly capable of minimizing or reducing battery performance degradation by maintaining air permeability of the separator within an appropriate or suitable range while ensuring adherence between the electrode and separator while driving a rechargeable lithium battery with high energy density, and a rechargeable lithium battery including the same.

Additional aspects will be set forth in part in the description which follows and, in part, will be apparent from the description, or may be learned by practice of the presented embodiments of the disclosure.

In one or more embodiments of the present disclosure, an electrode assembly includes an electrode and a separator, wherein the electrode includes a current collector, an electrode active material layer on the current collector, and an adhesive layer on the electrode active material layer; and wherein the separator has a larger area than the adhesive layer of the electrode; and a surface of the separator opposing the adhesive layer of the electrode is divided into an adhesive region in contact with the adhesive layer of the electrode and an overhang region not in contact with the adhesive layer of the electrode.

In one or more embodiments of the present disclosure, an electrode assembly includes a positive electrode, a negative electrode, and a separator, wherein each of the positive electrode and the negative electrode includes a current collector, an electrode active material layer on the current collector, and an adhesive layer on the electrode active material layer; and wherein the separator has a larger surface area than the adhesive layer of one of the positive or the negative electrode; and a surface of the separator opposite to the adhesive layer of the one of the positive electrode or the negative electrode is divided into an adhesive region in contact with the adhesive layer of the one of the positive or the negative electrode and an overhang region not in contact with the adhesive layer of the one of the positive electrode or the negative electrode.

In one or more embodiments of the present disclosure, a rechargeable lithium battery includes the electrode assembly of any one of the embodiments above and an electrolyte.

In the electrode assembly and rechargeable lithium battery including the same according to embodiments of the present disclosure, the adherence between the electrode and the separator is secured at an excellent or suitable level during operation, and the air permeability of the separator is maintained in an appropriate or suitable range, thereby minimizing or reducing battery performance degradation.

DETAILED DESCRIPTION

Figure 1:
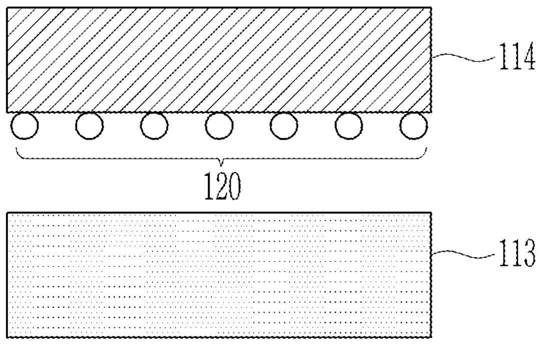
FIGS. 1 and 2 are schematic views showing electrode assemblies according to embodiments of the present disclosure.

Hereinafter, specific embodiments will be described in more detail so that those of ordinary skill in the art can easily implement them. However, this disclosure may be embodied in many different forms and is not construed as limited to the example embodiments set forth herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

The terminology used herein is used to describe embodiments only, and is not intended to limit the present disclosure. As used herein, the singular forms “a” and “an” are intended to include the plural forms as well, unless the context clearly indicates otherwise.

The term “combination thereof” means a mixture, laminate, composite, copolymer, alloy, blend, reaction product, and/or the like of the constituents.

It should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., are exaggerated for clarity and like reference numerals designate like elements throughout, and duplicative descriptions thereof may not be provided the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, it will also be understood that when an element or layer is referred to as being "between" two elements or layers, it can be the only element or layer between the two elements or layers, or one or more intervening elements or layers may also be present.

In addition, "layer" herein includes not only a shape formed on the whole surface when viewed from a plan view, but also a shape formed on a partial surface.

"Particle diameter" or "average particle diameter" may be measured by a method well known to those skilled in the art, for example, may be measured by a particle size analyzer, or may be measured by a transmission electron micrograph or a scanning electron micrograph. Alternatively, it is possible to obtain an average particle diameter value by measuring using a dynamic light scattering method, performing data analysis, counting the number of particles for each particle size range, and calculating from this. When a definition is not otherwise provided, an average particle diameter indicates a diameter (D50) of particles having a cumulative volume of 50% by volume in the particle size distribution.

In the present disclosure, when particles are spherical, "diameter" indicates a particle diameter or an average particle diameter, and when the particles are non-spherical, the "diameter" indicates a major axis length or an average major axis length. The diameter (or size) of the particles may be measured utilizing a scanning electron microscope or a particle size analyzer. As the particle size analyzer, for example, HORIBA, LA-950 laser particle size analyzer, may be utilized. When the size of the particles is measured utilizing a particle size analyzer, the average particle diameter (or size) is referred to as D50. D50 refers to the average diameter (or size) of particles whose cumulative volume corresponds to 50 vol % in the particle size distribution (e.g., cumulative distribution), and refers to the value of the particle size corresponding to 50% from the smallest particle when the total number of particles is 100% in the distribution curve accumulated in the order of the smallest particle size to the largest particle size.

"Thickness" may be measured through a picture taken with an optical microscope such as a scanning electron microscope.

Electrode Assembly I

In one or more embodiments, an electrode assembly includes an electrode and a separator, wherein the electrode includes a current collector, an electrode active material layer on the current collector, and an adhesive layer on the electrode active material layer; the separator has a larger area than the adhesive layer of the electrode while disposed on the adhesive layer of the electrode; and a surface of the separator opposite to the adhesive layer of the electrode is divided into an adhesive region in contact with the adhesive layer of the electrode and an overhang region not in contact with the adhesive layer of the electrode.

Figure 2:
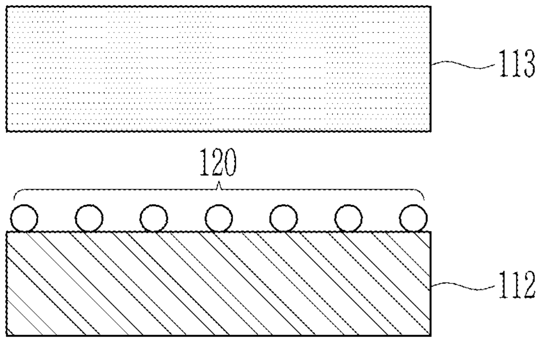

FIGS. 1 and 2 are schematic views showing electrode assemblies according to embodiments of the present disclosure. Herein, the adhesive layer 120 may be applied to a positive electrode 114 alone (FIG. 1) or a negative electrode 112 alone (FIG. 2).

Recently, as there has been a high interest in the industry in rechargeable lithium batteries having energy density. In order to improve reliability of the rechargeable lithium batteries with high energy density, it is important to stabilize interfaces between electrodes and a separator and to ensure substantially uniform movement of lithium ions therebetween.

A method of manufacturing the electrode assembly by forming an adhesive layer on the surface of the separator and adhering it to the electrodes is suitable. When a rechargeable lithium battery including this electrode assembly is evaluated at a high temperature, gas traps are suppressed or reduced, minimizing or reducing the generation of irreversible lithium. However, when a separator including an adhesive layer is manufactured, adherence between electrodes and the separator, air permeability of the separator, and furthermore, safety and reliability of the rechargeable lithium battery are difficult to ensure. For example, when an electrode assembly is manufactured by manufacturing the separator including an adhesive layer and then, adhering the separator to electrodes with high energy density, the adherence between electrodes and the separator is gradually deteriorated while driving the rechargeable lithium battery, and concurrently (e.g., simultaneously), air permeability of the separator is increased. As a result, safety and reliability of the rechargeable lithium battery is inevitably deteriorated.

In this regard, in one or more embodiments, an electrode including an adhesive layer is manufactured. For example, the following three features and/or aspects may be provided for by one or more embodiments of the present disclosure: 1) the electrode including an adhesive layer is manufactured and then, adhered to a separator, manufacturing an electrode assembly, 2) adherence may be secured between the electrodes and the separator while driving a rechargeable lithium battery, and concurrently (e.g., simultaneously), 3) air permeability of the separator may be maintained within an appropriate or suitable range, thereby, ensuring safety and reliability of the rechargeable lithium battery.

1) For example, the electrode assembly according to one or more embodiments, which includes a so-called 'overhang' region, may have a structural difference from an electrode assembly to which the separator including an adhesive layer is applied.

For example, in the electrode assembly according to one or more embodiments of the present disclosure, a surface of the separator opposing the adhesive layer of the electrode is divided into an adhesive region in contact with the adhesive layer of the electrode and an overhang region not in contact with the adhesive layer of the electrode. However, the separator including an adhesive layer, because the whole surface of the separator facing an adhesive layer of electrodes contacts the adhesive layer of the electrode, has no overhang region at all.

2) The electrode assembly according to one or more embodiments of the present disclosure, in terms of adherence between the electrodes and the separator while driving a rechargeable lithium battery, exhibits different effects from the electrode assembly to which the separator including an adhesive layer is applied.

In general, an electrode (for example, an electrode active material layer) includes larger pores than a separator. Accordingly, when the adhesive layer is formed on the electrodes, an adhesive material having a relatively larger size (e.g., acryl-based polymer particles) rather than a filler (e.g., fluorine-based polymer particles) may be more applied. As a result, when the electrode including the adhesive layer is utilized to manufacture an electrode assembly, excellent or suitable adherence between the electrodes and the separator may be maintained, and strong bending strength of the electrode assembly may be secured even after charging and discharging.

However, in order to form an adhesive layer on the separator, a larger amount of a filler with a smaller size than the adhesive material may be applied. As a result, when the separator including the adhesive layer is utilized to manufacture an electrode assembly, adherence between the electrodes and the separator may be deteriorated, and bending strength of the electrode assembly may be weakened after the charging and discharging.

3) In one or more embodiments, the electrode assembly has a different effect than an electrode assembly to which the separator including the adhesive layer is applied, in terms of air permeability of the separator while driving a rechargeable lithium battery.

For example, when an adhesive layer is formed on the electrodes, an overhang region not contacting the adhesive layer of the electrodes exists on the surface of the separator facing the adhesive layer of the electrodes. It has a similar effect as pattern-coating on the surface of the separator and thus maintains pores of the separator, securing air permeability of the separator within an appropriate or suitable range, even while driving a rechargeable lithium battery.

However, when the adhesive layer is formed on the separator, it is inevitable to coat the whole surface of the separator, which may destroy the pores of the separator and gradually increase the air permeability of the separator during driving a rechargeable lithium battery.

1) The electrode assembly having the aforementioned structural features 2) secures adherence between the electrodes and the separator while driving a rechargeable lithium battery, and concurrently (e.g., simultaneously), 3) maintains air permeability of the separator within an appropriate or suitable range, ensuring safety and reliability of the rechargeable lithium battery.

Hereinafter, an electrode assembly according to one or more embodiments will be described in more detail.

Transverse Direction (TD) Overhang

Figure 3:
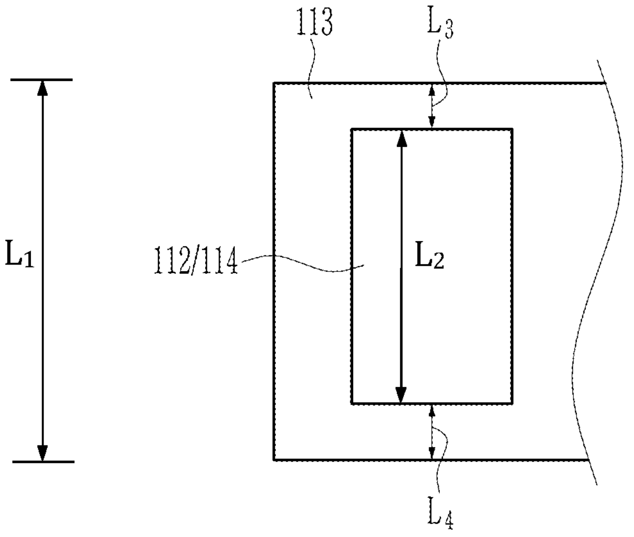
FIG. 3 is a schematic plan view illustrating a portion of an electrode assembly according to one or more embodiments of the present disclosure.

FIG. 3 is a plan schematic view illustrating a portion of an electrode assembly according to one or more embodiments of the present disclosure. As shown in FIG. 3, the separator 113 is disposed on the adhesive layer of the electrodes 112/114 and has a larger area than the adhesive layer of the electrode; and in particular, the transverse direction (TD) length of the separator 113 may be longer than the transverse direction (TD) length of the electrode. In this case, the transverse direction (TD) length of the separator $L_1$ and the transverse direction (TD) length of the electrode $L_2$ may satisfy Equation 1:

$$0\ \text{mm} \le L_1 - L_2 \le 9\ \text{mm} \quad \text{Equation 1}$$

In Equation 1, $L_1$ is a transverse direction (TD) length of the separator; and $L_2$ is the transverse (TD) length of the electrode.

For example, the lower limit of Equation 1 may be 0 mm, 0.5 mm, 1 mm, 1.5 mm, or 2 mm, and the upper limit may be 9 mm, 8.5 mm, 8 mm, 7.5 mm, 7 mm, 6.5 mm, 6 mm, 5.5 mm, 5 mm, 4.5 mm, or 4 mm.

The negative electrode may have a larger area than the positive electrode and may have a greater transverse direction length. Accordingly, the upper/lower limits of Equation 1 may vary depending on the type or kind of the electrode.

More specifically, when the electrode is a negative electrode, Equation 1 may be Equation 1-1:

$$0\ \text{mm} \le L_1 - L_{21} \le 6\ \text{mm} \quad \text{Equation 1-1}$$

In Equation 1-1, $L_1$ is a transverse direction (TD) length of the separator; and $L_{21}$ is the transverse (TD) length of the negative electrode.

For example, the lower limit of Equation 1-1 may be 0 mm, 0.5 mm, 1 mm, 1.5 mm, or 2 mm, and the upper limit may be 6 mm, 5.5 mm, 5 mm, 4.5 mm, or 4 mm.

When the electrode is a positive electrode, Equation 1 may be Equation 1-2:

$$3\ \text{mm} \le L_1 - L_{22} \le 9\ \text{mm} \quad \text{Equation 1-2}$$

In Equation 1-2, $L_1$ is a transverse direction (TD) length of the separator; and $L_{22}$ is the transverse (TD) length of the positive electrode.

For example, the lower limit of Equation 1-1 may be 3 mm, 3.5 mm, 4 mm, 4.5 mm, or 5 mm, and the upper limit may be 9 mm, 8.5 mm, 8 mm, 7.5 mm, or 7 mm.

The transverse direction (TD) overhang of the separator may be respectively disposed on (e.g., above) and under (e.g., below) the electrode in the transverse direction (TD). In this case, in the transverse direction (TD) of the separator, a length of the overhang region disposed respectively on (e.g., above) and under (e.g., below) the electrode in the transverse direction (TD) may satisfy Equations 2 and 3:

$$0\ \text{mm} \le L_3 \le 6\ \text{mm} \quad \text{Equation 2}$$

In Equation 2, in the transverse direction (TD) of the separator, $L_3$ is a length of the overhang region disposed on (e.g., above) the electrode in the transverse direction (TD). For example, the lower limit of Equation 2 may be 0 mm, 0.5 mm, 1 mm, or 1.5 mm, and the upper limit may be 6 mm, 5 mm, 4 mm, or 3 mm.

$$0\ \text{mm} \le L_4 \le 6\ \text{mm} \quad \text{Equation 3}$$

In Equation 3, in the transverse direction (TD) of the separator, $L_4$ is a length of the overhang region disposed under (e.g., below) the electrode in the transverse direction (TD). For example, the lower limit of Equation 3 may be 0 mm, 0.5 mm, 1 mm, or 1.5 mm, and the upper limit may be 6 mm, 5.5 mm, 5 mm, 4.5 mm, 4 mm, 3.5 mm, or 3 mm.

As mentioned above, the negative electrode may have a larger area than the positive electrode and may have a greater lateral length. Accordingly, the upper and lower limits of Equations 2 and 3 may vary depending on the type or kind of the electrode.

For example, the electrode may be a negative electrode, and Equations 2 and 3 may be Equations 2-1 and 3-1, respectively:

$$0\ \text{mm} \le L_3 \le 3\ \text{mm} \quad \text{Equation 2-1}$$

In Equation 2-1, in the transverse direction (TD) of the separator, $L_{31}$ is a length of the overhang region disposed on (e.g., above) the negative electrode in the transverse direction (TD).

$$0\ \text{mm} \le L_{41} \le 3\ \text{mm} \quad \text{Equation 3-1}$$

In Equation 3-1, in the transverse direction (TD) of the separator, $L_{41}$ is a length of the overhang region disposed under (e.g., below) the negative electrode in the transverse direction (TD).

For example, the electrode may be a positive electrode, and Equations 2 and 3 may be Equations 2-2 and 3-2, respectively:

$$1.5\ mm \leq L_{32} \leq 4.5\ mm \quad \text{Equation 2-2}$$

In Equation 2-2, in the transverse direction (TD) of the separator, $L_{32}$ is a length of the overhang region disposed on (e.g., above) the positive electrode in the transverse direction (TD).

$$1.5\ mm \leq L_{42} \leq 4.5\ mm \quad \text{Equation 3-2}$$

In Equation 3-2, in the transverse direction (TD) of the separator, $L_{42}$ is a length of the overhang region disposed under (e.g., below) the positive electrode in the transverse direction (TD).

Shape of Electrode Assembly

In one or more embodiments, a shape of the electrode assembly is not particularly limited, but may be a stack type or kind, a z-stack type or kind, a stack-folding type or kind, or a jelly roll type or kind.

Figure 4:
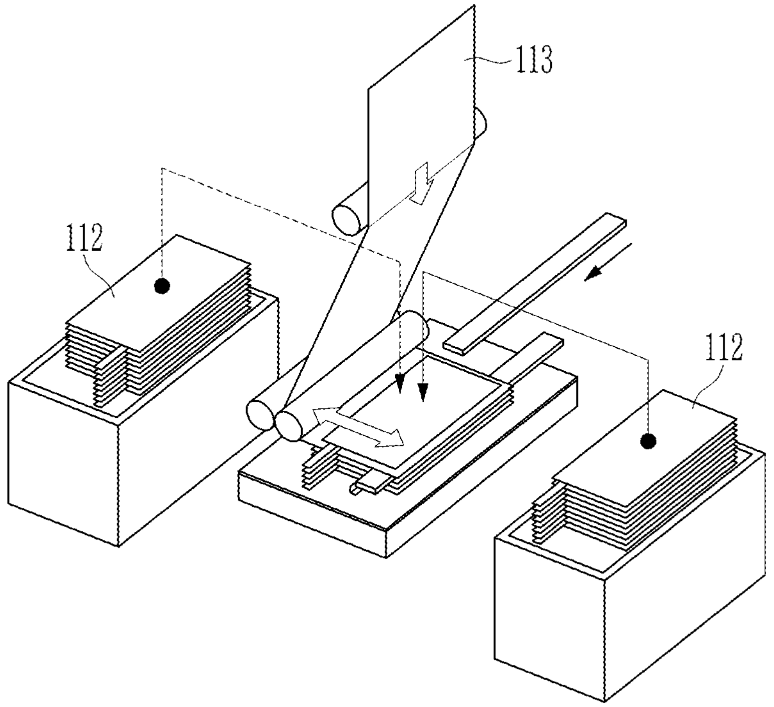
FIG. 4 is a schematic perspective view illustrating a method of assembling an electrode assembly in a z-stack type or kind according to one or more embodiments of the present disclosure.

FIG. 4 is a schematic perspective view illustrating a method of assembling an electrode assembly in a z-stack type or kind according to one or more embodiments of the present disclosure. When the electrode assembly has a z-stack type or kind as shown in FIG. 4, two or more electrodes 112/114 are folded in a zigzag state and then, alternately inserted into where a separator 113 is folded in the zigzag state. In this case, the length of the overhang region at the outermost side of either the right or left side of the longitudinal direction (MD) of the separator may satisfy Equation 4:

$$2^*L_5 \leq L_6 \quad \text{Equation 4}$$

In Equation 4, $L_5$ is a longitudinal (MD) length of any one of the two or more electrodes, for example, a longitudinal (MD) length of an electrode having a smaller area among the two or more electrodes; and $L_6$ is a length of the overhang region at the outermost side of either the right or left side of the longitudinal direction (MD) of the separator.

Figure 5:
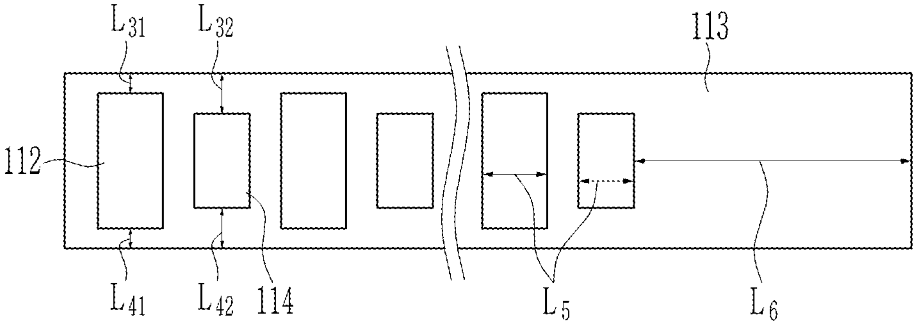
FIG. 5 is a schematic plan view illustrating longitudinal and transverse direction overhangs when an electrode assembly is of a z-stack type or kind, according to one or more embodiments of the present disclosure.
Figure 6:
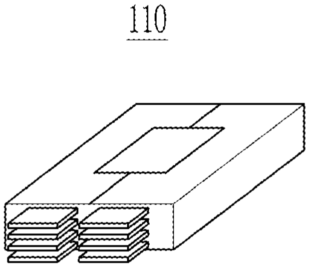
FIG. 6 is a schematic perspective view illustrating a form in which an electrode assembly is assembled in a z-stack type or kind, according to one or more embodiments of the present disclosure.

FIG. 5 is a schematic plan view illustrating longitudinal and transverse direction overhangs when an electrode assembly is of a z-stack type or kind according to one or more embodiments of the present disclosure. For reference, in FIG. 5, for understanding of an overhang region, positive and negative electrodes are shown to be located on the same side of the separator. The electrode assembly 110 assembled with the z-stack type or kind according to FIGS. 4 and 5 is schematically illustrated in FIG. 6.

A shape of the electrode assembly other than the z-stack type or kind will be briefly described as follows.

The electrode assembly may have a stack type or kind, in which two or more separators are present and disposed between the two or more electrodes.

The electrode assembly may have a stack-folding type or kind, in which two or more electrodes are present and a plurality of unit cells having a separator for unit cells is interposed between the two or more electrodes. These are overlapped, and each overlapping portion may have a structure in which a substantially continuous folding membrane is interposed.

The electrode assembly may have a jelly-roll type or kind, which is formed by winding two or more electrodes and a separator disposed therebetween together.

Adhesive Layer

The adhesive layer may include a material capable of adhering the electrodes and the separator. Herein, the material for adhering the electrodes and the separator may be any material suitable in the art. For example, an adhesive material including acryl-based polymer particles, fluorine-based polymer particles, or a combination thereof may be utilized.

The acryl-based polymer particles are utilized to obtain adherence between the adhesive layer and an active material layer and may be a polymer or copolymer containing an acryl group or a polymer or copolymer containing a unit that the acryl group has modified. For example, the acryl-based polymer particles may include poly(meth)acrylic acid, poly(meth)acrylate, polymethyl(meth)acrylate, polyacrylonitrile, an acrylonitrile-styrene-butadiene copolymer, a copolymer thereof, mixture thereof, or a combination thereof.

The fluorine-based polymer particles serve to provide pores to the adhesive layer, and because the binder itself is hard and has a low electrolyte impregnation property, deformation such as film formation does not occur after the negative electrode is manufactured, and even after the final battery is manufactured, the adhesive layer allows the pores to be maintained.

The fluorine-based polymer particles may include a vinylidene fluoride homopolymer, a copolymer containing vinylidene fluoride units, a copolymer thereof, a mixture thereof, or a combination thereof. Specific examples of the fluorine-based polymer particles may include polyvinylidene fluoride, polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, polyvinylidene fluoride-co-trifluorochloroethylene, polyvinylidene fluoride-co-ethylene, or one or more combinations thereof.

In the adhesive layer, the acryl-based polymer particles and the fluorine-based polymer particles may be mixed in a weight ratio of about 75:25 to about 50:50. When the acryl-based polymer particles and the fluorine-based polymer particles are mixed within the range, excellent or suitable battery characteristics may be exhibited including appropriate or suitable strength.

The adhesive layer may further include an additive in order to further a binding force between the active material layer and the adhesive layer. This additive may include polyacrylic acid, polyvinyl alcohol, or a combination thereof. When the adhesive layer further includes the additive, a content (e.g., amount) of the additive may be about 5 parts by weight to about 10 parts by weight based on about 100 parts by weight of the adhesive layer. When the additive is included within the range, an excellent or suitable effect of improving the binding force between active material layer and adhesive layer is obtained.

The adhesive layer may have a thickness of about 1 μm to about 5 μm. For example, the thickness of the adhesive layer has a lower limit of about 1 μm, about 1.5 μm, or about 2 μm and an upper limit of about 5 μm, about 4 μm, or about 3 μm. In one or more embodiments, a thickness ratio of the adhesive layer to the electrode active material layer may be about 1:218 to about 5:218 (adhesive layer:electrode active material layer). For example, the thickness ratio may have a lower limit of about 4:1000, about 7:1000, or about 1:100 and an upper limit of about 2:100, about 18:1000, or about 14:1000. Within these ranges, the electrodes and the separator may maintain appropriate or suitable adherence while driving a rechargeable lithium battery.

Figure 7:
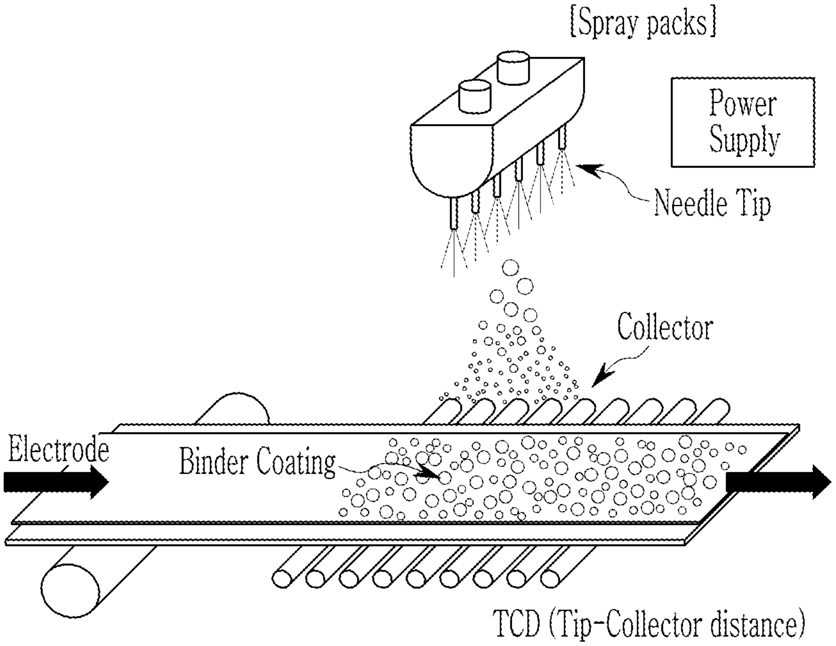
FIG. 7 is a schematic perspective view illustrating a method of forming an electrode adhesive layer according to one or more embodiments of the present disclosure.

FIG. 7 is a schematic perspective view illustrating a method of forming an electrode adhesive layer according to one or more embodiments of the present disclosure. For example, the adhesive layer may be formed by electric spraying as shown in FIG. 7, so that the electrode active material layer may be minimized or reduced from damage. For example, the adhesive layer may be formed by the electric spraying and coated in the form of dots on the electrode active material layer. The electric spraying may be performed at about 20 kV to about 40 kV for greater than or equal to about 1 second and less than about 20 seconds. In one or more embodiments, the dots may have an individual size of about 200 μm to about 300 μm. The shape and size of the dots may be due to the adhesive layer being formed by the electric spraying.

Electrodes

Regardless of whether the coating layer is included, the positive electrode includes a current collector and a positive active material layer formed on the current collector. According to one or more embodiments, the positive electrode may have a structure in which a current collector, a positive active material layer, a functional layer, and an adhesive layer are stacked in this order.

The positive active material layer may include a positive active material, and may further include a binder and/or a conductive material.

The positive active material may include lithiated intercalation compounds that reversibly intercalate and deintercalate lithium ions. Examples of the positive active material include a compound represented by any one of the following chemical formulas: $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD$ ($0.90 \le a \le 1.8$, $0 \le b \le 0.5$, $0 \le c \le 0.5$, $0 \le \alpha \le 2$); $Li_aNi_{1-b-c}CO_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}CO_bX_cO_{2-\alpha}T_2$ ($0.90 \le a \le 1.8$, $0 \le b \le 0.5$, $0 \le c \le 0.05$, $0 \le \alpha \le 2$); $Li_aNi_{1-b-c}Mn_bX_cD_a$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.05$, $0 \le \alpha \le 2$); $Li_aNi_{1-b-c}Mn_bX_cO_{2-\alpha}T_2$($0.90 \le a \le 1.8$, $0 \le \le b \le 0.5$, $0 \le c \le 0.05$, $0 \le \alpha \le 2$); $Li_aNi_bE_cG_dO_2$($0.900 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$($0 \le f \le 2$); $Li_{(3-f)}Fe_2(PO_4)_3$($0 \le f \le 2$); and $Li_aFePO_4$ ($0.90 \le a \le 1.8$).

In these chemical formulas, A includes (e.g., is selected from) Ni, Co, Mn, and/or a combination thereof; X includes (e.g., is selected from) Al, Ni, Co, Mn, Cr, Fe, Mg, Sr, V, a rare earth element, and/or a combination thereof; D includes (e.g., is selected from) O, F, S, P, and/or a combination thereof; E includes (e.g. is selected from) Co, Mn, and/or a combination thereof; T includes (e.g., is selected from) F, S, P, and/or a combination thereof; G includes (e.g., is selected from) Al, Cr, Mn, Fe, Mg, La, Ce, Sr, V, and/or a combination thereof; Q includes (e.g., is selected from) Ti, Mo, Mn, and/or a combination thereof; Z includes (e.g., is selected from) Cr, V, Fe, Sc, Y, and/or a combination thereof; and J includes (e.g., is selected from) V, Cr, Mn, Co, Ni, Cu, and/or a combination thereof.

The compound may have a coating layer on the surface, or may be mixed with another compound having a coating layer. The coating layer may include at least one coating element compound including (e.g., selected from) an oxide of a coating element, a hydroxide of a coating element, an oxyhydroxide of a coating element, an oxycarbonate of a coating element, and/or a hydroxy carbonate of a coating element. The compound of the coating layer may be amorphous or crystalline. The coating element included in the coating layer may include Mg, Al, Co, K, Na, Ca, Si, Ti, V, Sn, Ge, Ga, B, As, Zr, or a combination thereof. The coating layer forming process may utilize a method that does not adversely affect the physical properties of the positive active material, for example, spray coating, dipping, and/or the like.

The positive active material may include, for example, a lithium nickel composite oxide represented by Chemical Formula 11.

$$Li_{a11}Ni_{x11}M^{11}_{y11}M^{12}_{1-x11-y12}O_2$$ Chemical Formula 11

In Chemical Formula 11, $0.9 \le a11 \le 1.8$, $0.3 \le x11 \le 1$, $0 \le y11 \le 0.7$, and $M^{11}$ and $M^{12}$ may each independently be (e.g., be selected from) Al, B, Ce, Co, Cr, F, Mg, Mn, Mo, Nb, P, S, Si, Sr, Ti, V, W, Zr, and/or a combination thereof.

In Chemical Formula 11, $0.4 \le x11 \le 1$ and $0 \le y11 \le 0.6$; $0.5 \le x11 \le 1$ and $0 \le y11 \le 0.5$; $0.6 \le x11 \le 1$ and $0 \le y11 \le 0.4$; $0.7 \le x11 \le 1$ and $0 \le y11 \le 0.3$; $0.8 \le x11 \le 1$ and $0 \le y11 \le 0.2$; or $0.9 \le x11 \le 1$ and $0 \le y11 \le 0.1$.

As a specific example, the positive active material may include a lithium nickel cobalt composite oxide represented by Chemical Formula 12.

$$Li_{a12}Ni_{x12}Co_{y12}M^{13}_{1-x12-y12}O_2$$ Chemical Formula 12

In Chemical Formula 12, $0.9 \le a12 \le 1.8$, $0.3 \le x12 \le 1$, $0 \le y12 \le 0.7$, and $M^{13}$ includes (e.g., is selected from) Al, B, Ce, Cr, F, Mg, Mn, Mo, Nb, P, S, Si, Sr, Ti, V, W, Zr, and/or a combination thereof.

In Chemical Formula 12, $0.3 \le x12 \le 0.99$ and $0.01 \le y12 \le 0.7$; $0.4 \le x12 \le 0.99$ and $0.01 \le y12 \le 0.6$; $0.5 \le x12 \le 0.99$ and $0.01 \le y12 \le 0.5$; $0.6 \le x12 \le 0.99$ and $0.01 \le y12 \le 0.4$; $0.7 \le x12 \le 0.99$ and $0.01 \le y12 \le 0.3$; $0.8 \le x12 \le 0.99$ and $0.01 \le y12 \le 0.2$; or $0.9 \le x12 \le 0.99$ and $0.01 \le y12 \le 0.1$.

As a specific example, the positive active material may include a lithium nickel cobalt composite oxide represented by Chemical Formula 13.

$$Li_{a13}Ni_{x13}Co_{y13}M^{14}_{z13}M^{15}_{1-x13-y13-z13}O_2$$ Chemical Formula 3

In Chemical Formula 13, $0.9 \le a13 \le 1.8$, $0.3 \le x13 \le 0.98$, $0.01 \le y13 \le 0.69$, $0.01 \le z13 \le 0.69$, $M^{14}$ includes (e.g., is selected from) Al, Mn, and/or a combination thereof, and $M^{15}$ includes (e.g., is selected from) B, Ce, Cr, F, Mg, Mo, Nb, P, S, Si, Sr, Ti, V, W, Zr, and/or a combination thereof.

In Chemical Formula 13, $0.4 \le x13 \le 0.98$, $0.01 \le y13 \le 0.59$, and $0.01 \le z13 \le 0.59$; $0.5 \le x13 \le 0.98$, $0.01 \le y13 \le 0.49$, and $0.01 \le z13 \le 0.49$; $0.6 \le x13 \le 0.98$, $0.01 \le y13 \le 0.39$, and $0.01 \le z13 \le 0.39$; $0.7 \le x13 \le 0.98$, $0.01 \le y13 \le 0.29$, and $0.01 \le z13 \le 0.29$; $0.8 \le x13 \le 0.98$, $0.01 \le y13 \le 0.19$, and $0.01 \le z13 \le 0.19$; or $0.9 \le x13 \le 0.98$, $0.01 \le y13 \le 0.09$, and $0.01 \le z13 \le 0.09$.

A content (e.g., amount) of the positive active material may be about 90 wt % to about 98 wt %, for example about 90 wt % to about 95 wt % based on the total weight of the positive active material layer. Each content (e.g., amount) of the binder and the conductive material may be about 1 wt % to about 5 wt % based on the total weight of the positive active material layer.

The binder improves binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The conductive material is utilized to impart conductivity to the electrode, and any material may be utilized as long as it does not cause chemical change in the battery to be configured and is an electron conductive material. Examples of the conductive material may include a carbon-based material such as natural graphite, artificial graphite, carbon black, acetylene black, Ketjenblack®, carbon fiber, carbon nanotube, and/or the like; a metal-based material of a metal powder or a metal fiber, and/or the like including copper, nickel, aluminum silver, and/or the like; a conductive polymer such as a polyphenylene derivative; or a mixture thereof.

The current collector may include an aluminum foil, but is not limited thereto.

Regardless of whether the coating layer is included, the negative electrode includes a current collector and a negative active material layer formed on the current collector and including a negative active material. According to one or more embodiment, the negative electrode may have a structure in which a current collector, a negative active material layer, a functional layer, and an adhesive layer are sequentially stacked.

The negative active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include, for example crystalline carbon, amorphous carbon, or a combination thereof as a carbon-based negative active material. The crystalline carbon may be non-shaped, or sheet, flake, spherical, or fiber shaped natural graphite or artificial graphite. The amorphous carbon may be a soft carbon, a hard carbon, a mesophase pitch carbonization product, calcined coke, and/or the like.

The lithium metal alloy includes an alloy of lithium and a metal including (e.g., selected from) Na, K, Rb, Cs, Fr, Be, Mg, Ca, Sr, Si, Sb, Pb, In, Zn, Ba, Ra, Ge, Al, and/or Sn.

The material capable of doping/dedoping lithium may be a Si-based negative active material or a Sn-based negative active material. The Si-based negative active material may include silicon, a silicon-carbon composite, $SiO_x$ ($0<x<2$), a Si-Q alloy (wherein Q is an alkali metal, an alkaline-earth metal, a Group 13 element, a Group 14 element, a Group 15 element, a Group 16 element, a transition metal, a rare earth element, and/or a combination thereof, but not Si) and the Sn-based negative active material may include Sn, $SnO_2$, and/or a Sn—R alloy (wherein R is an alkali metal, an alkaline-earth metal, a Group 13 element, a Group 14 element, a Group 15 element, a Group 16 element, a transition metal, a rare earth element, and/or a combination thereof, but not Sn). At least one of these materials may be mixed with $SiO_2$. The elements Q and R may include (e.g., may be selected from) Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and/or a combination thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, or a polymer resin such as a phenol resin, a furan resin, or a polyimide resin. In this case, the content (e.g., amount) of silicon may be about 10 wt % to about 50 wt % based on the total weight of the silicon-carbon composite. In one or more embodiments, the content (e.g., amount) of the crystalline carbon may be about 10 wt % to about 70 wt % based on the total weight of the silicon-carbon composite, and the content (e.g., amount) of the amorphous carbon may be about 20 wt % to about 40 wt % based on the total weight of the silicon-carbon composite. In one or more embodiments, a thickness of the amorphous carbon coating layer may be about 5 nm to about 100 nm. An average particle diameter ($D_{50}$) of the silicon particles may be about 10 nm to about 20 μm. The average particle diameter ($D_{50}$) of the silicon particles may be about 10 nm to about 200 nm. The silicon particles may exist in an oxidized form, and in this case, an atomic content (e.g., amount) ratio of Si:O in the silicon particles indicating a degree of oxidation may be a weight ratio of about 99:1 to about 33:67. The silicon particles may be $SiO_x$ particles, and in this case, the range of x in $SiO_x$ may be greater than about 0 and less than about 2. In the present specification, unless otherwise defined, an average particle diameter ($D_{50}$) indicates a diameter of particles having a cumulative volume of 50 volume % in the particle size distribution.

The Si-based negative active material or Sn-based negative active material may be mixed with the carbon-based negative active material. When the Si-based negative active material or Sn-based negative active material and the carbon-based negative active material are mixed and utilized, the mixing ratio may be a weight ratio of about 1:99 to about 90:10.

In the negative active material layer, the negative active material may be included in an amount of about 95 wt % to about 99 wt % based on the total weight of the negative active material layer.

In one or more embodiments, the negative active material layer further includes a binder, and may optionally further include a conductive material. The content (e.g., amount) of the binder in the negative active material layer may be about 1 wt % to about 5 wt % based on the total weight of the negative active material layer.

In one or more embodiments, when the conductive material is further included, the negative active material layer may include about 90 wt % to about 98 wt % of the negative active material, about 1 wt % to about 5 wt % of the binder, and about 1 wt % to about 5 wt % of the conductive material.

The binder serves to adhere (e.g., to adhere well) the negative active material particles to each other and also to adhere the negative active material to the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder or a polymer resin binder. The rubber binder may include (e.g., may be selected from) a styrene-butadiene rubber, an acrylated styrene-butadiene rubber, an acrylonitrile-butadiene rubber, an acrylic rubber, a butyl rubber, a fluororubber, and/or a combination thereof. The polymer resin binder may include (e.g., may be selected from) polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and/or a combination thereof.

When a water-soluble binder is utilized as the negative electrode binder, a cellulose-based compound capable of imparting viscosity may be further included. As the cellulose-based compound, a mixture of one or more of carboxymethyl cellulose, hydroxypropylmethyl cellulose, methyl cellulose, or alkali metal salts thereof may be utilized. As the alkali metal, Na, K or Li may be utilized. The amount of the thickener utilized may be about 0.1 parts by weight to about 3 parts by weight based on 100 parts by weight of the negative active material.

The conductive material is included to provide electrode conductivity and any electrically conductive material may be utilized as a conductive material unless it causes a chemical change in a battery. Examples of the conductive material include a carbon-based material such as natural graphite, artificial graphite, carbon black, acetylene black, Ketjenblack®, a carbon fiber, carbon nanotube, and/or the like; a metal-based material of a metal powder or a metal fiber including copper, nickel, aluminum silver, and/or the like; a conductive polymer such as a polyphenylene derivative; or a mixture thereof.

The negative electrode current collector may include one of (e.g., one selected from) a copper foil, a nickel foil, a stainless steel foil, a titanium foil, a nickel foam, a copper foam, a polymer substrate coated with a conductive metal, and/or a combination thereof.

Separator

The separator separates a positive electrode and a negative electrode and provides a transporting passage for lithium ions and may be any generally-utilized separator in a lithium-ion battery. In other words, it may have low resistance to ion transport and excellent or suitable impregnation for an electrolyte. For example, it includes (e.g., is selected from) a glass fiber, polyester, Teflon, polyethylene, polypropylene, polytetrafluoroethylene, and/or a combination thereof, and may be in the form of a nonwoven fabric or a woven fabric. For example, in a lithium-ion battery, a polyolefin-based polymer separator such as polyethylene and polypropylene is mainly utilized. In order to ensure the heat resistance or mechanical strength, a coated separator including a ceramic component or a polymer material may be utilized. Optionally, it may have a mono-layered or multi-layered structure.

Electrode Assembly II

One or more embodiments of the present disclosure provide an electrode assembly including a positive electrode, a negative electrode, and a separator, wherein each of the positive electrode and the negative electrode includes a current collector, an electrode active material layer on the current collector, and an adhesive layer on the electrode active material layer; the separator has a larger area than the adhesive layer of the electrode while disposed on the adhesive layer of the electrode; and a surface of the separator opposite to the adhesive layer of the electrode is divided into an adhesive region in contact with the adhesive layer of the electrode and an overhang region not in contact with the adhesive layer of the electrode.

According to one or more embodiments, the positive electrode and the negative electrode both include the adhesive layer, and according to one or more of the aforementioned embodiments, either one electrode of the positive electrode and the negative electrode (i.e., at least one selected thereof) includes the adhesive layer. When both (e.g., simultaneously) the positive electrode and the negative electrode each include the adhesive layer, excellent or suitable adherence between electrodes and separator is secured, and air permeability of the separator is maintained within the appropriate or suitable range, minimizing or reducing battery performance degradation.

The illustration of one or more embodiments in which either one electrode of the positive electrode and negative electrode includes the adhesive layer may be equally applied to one or more embodiments in which both (e.g., simultaneously) the positive electrode and the negative electrode each include the adhesive layer. Accordingly, further detailed description may not be provided.

Rechargeable Lithium Battery

In one or more embodiments of the present disclosure, a rechargeable lithium battery includes the electrode assembly of any one of the above embodiments; and an electrolyte is provided.

For example, a rechargeable lithium battery according to one or more embodiments includes (1) an electrode assembly including an electrode and a separator, wherein the electrode includes a current collector, an electrode active material layer on the current collector, and an adhesive layer on the electrode active material layer; the separator has a larger area than the adhesive layer of the electrode while disposed on the adhesive layer of the electrode; and a surface of the separator opposing the adhesive layer of the electrode is divided into an adhesive region in contact with the adhesive layer of the electrode and an overhang region not in contact with the adhesive layer of the electrode, and (2) an electrolyte.

In one or more embodiments, a rechargeable lithium battery may include (1) an electrode assembly including a positive electrode, a negative electrode, and a separator, wherein each of the positive electrode and the negative electrode includes a current collector, an electrode active material layer on the current collector, and an adhesive layer on the electrode active material layer; the separator has a larger area than the adhesive layer of the electrode while disposed on the adhesive layer of the electrode; and a surface of the separator opposite to the adhesive layer of the electrode is divided into an adhesive region in contact with the adhesive layer of the electrode and an overhang region not in contact with the adhesive layer of the electrode, and (2) an electrolyte.

Such a rechargeable lithium battery has an excellent or suitable level of adherence between the electrode and the separator during operation and air permeability of the separator is maintained within an appropriate or suitable range, thereby minimizing or reducing battery performance degradation.

Electrolyte

The electrolyte includes a non-aqueous organic solvent and a lithium salt.

The non-aqueous organic solvent serves as a medium for transmitting ions taking part in the electrochemical reaction of a battery. The non-aqueous organic solvent may be a carbonate-based, ester-based, ether-based, ketone-based, or alcohol-based solvent, or aprotic solvent. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. Examples of the ester-based solvent include methyl acetate, ethyl acetate, n-propyl acetate, dimethyl acetate, methyl propionate, ethyl propionate, γ-butyrolactone, decanolide, valerolactone, mevalonolactone, caprolactone, and/or the like. The ether-based solvent may be dibutyl ether, tetraglyme, diglyme, dimethoxyethane, 2-methyltetrahydrofuran, tetrahydrofuran, and/or the like and the ketone-based solvent may be cyclohexanone, and/or the like. In one or more embodiments, the alcohol-based solvent may be ethyl alcohol, isopropyl alcohol, etc. and the aprotic solvent may be nitriles such as R—CN (where R is a C2 to C20 linear, branched, or cyclic hydrocarbon group and may include a double bond, an aromatic ring, or an ether bond), amides such as dimethylformamide, dioxolanes such as 1,3-dioxolane, sulfolanes, and/or the like.

The non-aqueous organic solvent may be utilized alone or in a mixture. When the organic solvent is utilized in a mixture, the mixture ratio may be controlled or selected in accordance with a desirable battery performance.

In one or more embodiments, in the case of the carbonate-based solvent, a mixture of a cyclic carbonate and a chain carbonate may be utilized. In this case, when the cyclic carbonate and the chain carbonate are mixed in a volume ratio of about 1:1 to about 1:9, the electrolyte may exhibit excellent or suitable performance.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

As the aromatic hydrocarbon-based solvent, an aromatic hydrocarbon-based compound represented by Chemical Formula I may be utilized.

Chemical Formula I

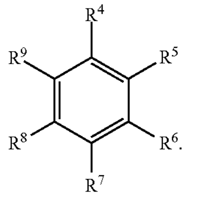

In Chemical Formula I, $R^4$ to $R^9$ may each independently be the same or different and include (e.g., are selected from) hydrogen, a halogen, a C1 to C10 alkyl group, a haloalkyl group, and/or a combination thereof.

Specific examples of the aromatic hydrocarbon-based solvent may include (e.g., may be selected) from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and/or a combination thereof.

The electrolyte may further include vinylene carbonate or an ethylene carbonate-based compound of Chemical Formula II in order to improve cycle-life of a battery.

Chemical Formula II

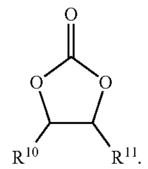

In Chemical Formula II, $R^{10}$ and $R^{11}$ may each independently be the same or different, and include (e.g., are selected from) hydrogen, a halogen, a cyano group, a nitro group, and/or a fluorinated C1 to C5 alkyl group, provided that at least one of $R^{10}$ and $R^{11}$ includes (e.g., is selected from) a halogen, a cyano group, a nitro group, and/or a fluorinated C1 to C5 alkyl group, but both (e.g., simultaneously) of $R^{10}$ and $R^{11}$ are not hydrogen.

Examples of the ethylene-based carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving cycle-life may be utilized within an appropriate or suitable range.

The lithium salt dissolved in the non-aqueous organic solvent supplies lithium ions in a battery, enables a basic operation of a rechargeable lithium battery, and improves transportation of the lithium ions between positive and negative electrodes.

Examples of the lithium salt include at least one supporting salt of (e.g., selected from) $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide): LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, an integer in a range of 1 to 20, lithium difluoro(bisoxolato) phosphate, LiCl, LiI, $LiB(C_2O_4)_2$ (lithium bis(oxalato) borate, LiBOB), and/or lithium difluoro(oxalato)borate (LiDFOB).

The lithium salt may be utilized in a concentration in a range of about 0.1 M to about 2.0 M. When the lithium salt is included at the above concentration range, an electrolyte may have excellent or suitable performance and lithium-ion mobility due to optimal or suitable electrolyte conductivity and viscosity.

Rechargeable lithium batteries may be classified as lithium-ion batteries, lithium-ion polymer batteries, and lithium polymer batteries according to the presence of a separator and the type or kind of electrolyte utilized therein. The rechargeable lithium batteries may have a variety of shapes and sizes, and include cylindrical, prismatic, coin, or pouch-type or kind batteries, and may be thin film batteries or may be rather bulky in size. Structures and manufacturing methods for these batteries pertaining to this disclosure are well known in the art.

Hereinafter, examples of the present disclosure and comparative examples are described. It is to be understood, however, that the examples are for the purpose of illustration and are not to be construed as limiting the present disclosure.

Example 1 (Manufacture of Electrode Including Adhesive Layer, Each Overhang on and Under Negative Electrode in TD Direction=0 mm)

(1) Manufacture of Positive Electrode 95 wt % of LiCoO2 as a positive active material, 3 wt % of polyvinylidene fluoride as a binder, and 2 wt % of Ketjenblack® as a conductive material were mixed in an N-methylpyrrolidone solvent, preparing positive active material slurry. The positive active material slurry was coated at a thickness of 71 μm on each of both sides of an aluminum current collector having a width: 74.5 mm, a length: 45.0 mm, and a thickness: 12 μm and dried, forming a 154 μm-thick positive active material layer. Herein, the positive active material slurry was coated in a method of die coating.

75 wt % of acryl-based polymer particles with an average particle diameter (D50) of 500 nm (Zeon Chemicals L.P.) as an adhesive material and 25 wt % of fluorine-based polymer particles with an average particle diameter (D50) of 250 nm (Solvay S.A.) as a filler were mixed in water as a solvent, preparing slurry for forming a positive electrode adhesive layer. This slurry was coated and dried at a thickness of 1 μm on each of both sides of the positive active material layer, forming a positive electrode adhesive layer. Herein, the slurry for forming the positive electrode adhesive layer is coated in a method of electric spraying under a condition of 30 kV.

In this way, 20 positive electrodes of Example 1 were manufactured.

(2) Manufacture of Negative Electrode 97.3 wt % of graphite as a negative active material, 0.5 wt % of Denka® black, 0.9 wt % of carboxylmethyl cellulose, and 1.3 wt % of styrene butadiene rubber were mixed in an aqueous solvent, preparing negative active material slurry. The slurry was coated at a thickness of 105 μm on each of both sides of a copper foil with a width: 76.5 mm, a length: 48.0 mm, and a thickness: 8 μm and dried, forming a 218 μm-thick negative active material layer. Herein, the negative active material slurry was coated in a method of die coating.

75 wt % of acryl-based polymer particles with an average particle diameter (D50) of 500 nm (Zeon Chemicals L.P.) as an adhesive material and 25 wt % of fluorine-based polymer particles with an average particle diameter (D50) of 250 nm (Solvay S.A.) as a filler were mixed in water as a solvent, preparing slurry for forming a positive electrode adhesive layer. This slurry was coated at a thickness of 1 μm on each of both sides of the negative active material layer and dried, forming a negative electrode adhesive layer. Herein, the slurry for the negative electrode adhesive layer was coated in a method of electric spraying under a condition of 30 kV.

In this way, 21 negative electrodes of Example 1 were manufactured.

(3) Manufacture of Battery Cells

A polyethylene separator with a width: 1900 mm, a length: 51.0 mm, and a thickness: 14 μm and then, folded into a zigzag with a width: 78.0 mm and a length: 51.0 mm. The 20 positive electrodes and the 21 negative electrodes were alternately inserted into the folded portions of a polyethylene separator to have respectively no overhang (0 mm) at all on (e.g., above) and under (e.g., below) the negative electrode in the transverse direction (TD), each overhang of 1.5 mm on (e.g., above) and under (e.g., below) the positive electrode in the transverse direction (TD), and an outermost overhang of 150 mm in the longitudinal direction (MD) of the separator.

The separator, the negative electrodes, and the positive electrodes in an assembled state were compressed in the perpendicular direction, completing an electrode assembly. However, the separator, the negative electrodes, and the positive electrodes were assembled in a specific assemble method shown in FIG. 4.

The electrode assembly was housed in a can, and an electrolyte solution prepared by adding 1.10 M $LiPF_6$ lithium salt in a mixed solvent of ethylene carbonate and diethyl carbonate in a volume ratio of 50:50 and then, injected thereinto, manufacturing a rechargeable lithium battery cell.

Example 2 (Manufacture of Electrode Including Adhesive Layer, Each Overhang on and Under Negative Electrode in TD Direction=0.5 mm)

Except for the overhang specification, the electrode assembly and the rechargeable lithium battery cell of Example 2 were manufactured in substantially the same manner as in Example 1.

Regarding the overhang, each overhang on (e.g., above) and under (e.g., below) the negative electrode in the transverse direction (TD) was 0.5 mm, and each overhang on (e.g., above) and under (e.g., below) the positive electrode in the transverse direction (TD) was 2.0 mm, and an outermost overhang in the longitudinal direction (MD) of the separator was 150 mm.

Example 3 (Manufacture of Electrode Including Adhesive Layer, Each Overhang on and Under Negative Electrode in TD Direction=1 mm)

Except for the overhang specification, the electrode assembly and the rechargeable lithium battery cell of Example 3 were manufactured in substantially the same manner as in Example 1.

Regarding the overhang, each overhang on (e.g., above) and under (e.g., below) the negative electrode in the transverse direction (TD) was 1 mm, each overhang on (e.g., above) and under (e.g., below) the positive electrode in the transverse direction (TD) was 2.5 mm, and outermost overhang in the longitudinal direction (MD) of the separator was 150 mm.

Example 4 (Manufacture of Electrode Including Adhesive Layer, Each Overhang on and Under Negative Electrode in TD Direction=1.5 mm)

Except for the overhang specification, the electrode assembly and the rechargeable lithium battery cell of Example 4 were manufactured in substantially the same manner as in Example 1.

Regarding the overhang, each overhang on (e.g., above) and under (e.g., below) the negative electrode in the transverse direction (TD) was 1.5 mm, each overhang on (e.g., above) and under (e.g., below) the positive electrode in the transverse direction (TD) was 3.0 mm, and outermost overhang in the longitudinal direction (MD) of the separator was 150 mm.

Example 5 (Manufacture of Electrode Including Adhesive Layer, Each Overhang on and Under Negative Electrode in TD Direction=2 mm)

Except for the overhang specification, the electrode assembly and the rechargeable lithium battery cell of Example 5 were manufactured in substantially the same manner as in Example 1.

Regarding the overhang, each overhang on (e.g., above) and under (e.g., below) the negative electrode in the transverse direction (TD) was 2 mm, each overhang on (e.g., above) and under (e.g., below) the positive electrode in the transverse direction (TD) was 3.5 mm, and outermost overhang in the longitudinal direction (MD) of the separator was 150 mm.

Example 6 (Manufacture of Electrode Including Adhesive Layer, Each Overhang on and Under Negative Electrode in TD Direction=2.5 mm)

Except for the overhang specification, the electrode assembly and the rechargeable lithium battery cell of Example 6 were manufactured in substantially the same manner as in Example 1.

Regarding the overhang, each overhang on (e.g., above) and under (e.g., below) the negative electrode in the transverse direction (TD) was 2.5 mm, each overhang on (e.g., above) and under (e.g., below) the positive electrode in the transverse direction (TD) was 4.0 mm, and outermost overhang in the longitudinal direction (MD) of the separator was 150 mm.

Example 7 (Manufacture of Electrode Including Adhesive Layer, Each Overhang on and Under Negative Electrode in TD Direction=3 mm)

Except for the overhang specification, the electrode assembly and the rechargeable lithium battery cell of Example 7 were manufactured in substantially the same manner as in Example 1.

Regarding the overhang, each overhang on (e.g., above) and under (e.g., below) the negative electrode in the transverse direction (TD) was 3 mm, each overhang on (e.g., above) and under (e.g., below) the positive electrode in the transverse direction (TD) was 4.5 mm, and outermost overhang in the longitudinal direction (MD) of the separator was 150 mm.

Comparative Example 1 (Manufacture of Separator Including Adhesive Layer, Each Overhang on and Under Negative Electrode in TD Direction=0 mm)

(1) Manufacture of Positive Electrode 95 wt % of $LiCoO_2$ as a positive active material, 3 wt % of polyvinylidene fluoride as a binder, and 2 wt % of Ketjenblack® as a conductive material were mixed in an N-methylpyrrolidone solvent, preparing positive active material slurry. The positive active material slurry was coated at a thickness of 71 μm on each of both sides of an aluminum current collector having a width: 74.5 mm, a length: 45.0 mm, and a thickness: 12 μm and dried, forming a 154 μm-thick positive active material. Herein, the positive active material slurry was coated in a method of die coating.

In this way, 20 positive electrodes of Comparative Example 1 were manufactured.

(2) Manufacture of Negative Electrode 97.3 wt % of graphite as a negative active material, 0.5 wt % of Denka® black, 0.9 wt % of carboxylmethyl cellulose, and 1.3 wt % of styrene butadiene rubber were mixed in an aqueous solvent, preparing negative active material slurry. The slurry was coated at a thickness of 105 μm on each of both sides of a copper foil with a width: 76.5 mm, a length: 48.0 mm, and a thickness: 8 μm and dried, forming a 218 μm-thick negative active material layer. Herein, the slurry for the negative electrode adhesive layer was coated in a method of Die coating.

In this way, 21 negative electrodes of Comparative Example 1 were manufactured.

(3) Manufacture of Separator 25 wt % of acryl-based polymer particles with an average particle diameter ($D_{50}$) of 500 nm (Zeon Chemicals L.P.) as an adhesive material and 75 wt % of fluorine-based polymer particles with an average particle diameter ($D_{50}$) of 250 nm (Solvay S.A.) as a filler were mixed in water as a solvent, preparing slurry for forming a positive electrode adhesive layer. This slurry was coated by 0.5 μm per one side on both sides of a polyethylene separator with a width: 1900 mm, a length: 51.0 mm, and a thickness: 13 μm and dried, forming a 14 μm-thick separator adhesive layer. Herein, the slurry for the separator adhesive layer was formed in a method of DM coating (a Direct Metering Coating, a kind of roll coating).

In this way, a separator of Comparative Example 1 was obtained.

(4) Manufacture of Battery Cell

The polyethylene separator of Comparative Example 1 was folded into a zigzag with a width: 78.0 mm and a length: 51.0 mm. The 20 positive electrodes and the 21 negative electrodes were alternately inserted into the folded portions of the polyethylene separator to have no outermost overhang of 0 mm in the longitudinal direction (MD) of the separator. Herein, the separator of Comparative Example 1 had an adhesive layer on the whole surface thereof and had no overhang at all on (e.g., above) and under (e.g., below) the positive electrode in the transverse direction (TD) as well as on (e.g., above) and under (e.g., below) the negative electrode in the transverse direction (TD).

The separator, the negative electrodes, and the positive electrodes in an assembled state were compressed in the perpendicular direction, completing an electrode assembly. However, the separator, the negative electrodes, and the positive electrodes were assembled in the assembling method as shown in FIG. 4.

The electrode assembly was housed in a can, and an electrolyte solution prepared by adding 1.0 M $LiPF_6$ lithium salt in a mixed solvent of ethylene carbonate and diethyl carbonate in a volume ratio of 50:50 and then, injected thereinto, manufacturing a rechargeable lithium battery cell.

Evaluation Example 1: Adherence

Each cell of Examples 1 to 7 and Comparative Example 1 was evaluated with respect to adherence, and the results are shown in Table 1.

The negative active material layer and the separator of each cell were evaluated with respect to the adherence under the conditions (85° C., 300 kgf, 60 sec) by utilizing HP (Heat Press). Then, a terminal end of the negative active material layer of the adhered battery cell was mounted on UTM equipment (LLOYD Instrument LF Plus), and a force as much as a length of 50 mm at 180° at 100 mm/min was applied thereto to measure a force required to delaminate the negative active material layer from the separator.

TABLE 1

| | Adherence (gf/mm) |
|---|---|
| Example 1 | 0.3 |
| Example 2 | 0.3 |
| Example 3 | 0.3 |

TABLE 1-continued

| | Adherence (gf/mm) |
|---|---|
| Example 4 | 0.3 |
| Example 5 | 0.3 |
| Example 6 | 0.3 |
| Example 7 | 0.3 |
| Comparative Example 1 | 0.15 |

In Table 1, Examples 1 to 7 exhibited doubled battery adherence, compared with that of Comparative Example 1. Accordingly, as shown in the embodiments, when an adhesive layer was formed on an electrode, compared with when the adhesive layer was formed on a separator, an electrode assembly and a battery cell having significantly high adherence were realized. In some embodiments, comparing Examples 1 to 7 one another, there was no adherence difference. Accordingly, when an adhesive layer was formed on electrodes as shown in an embodiment, regardless of the specifications, an electrode assembly and a battery cell turned out to secure adherence at a set or predetermined level of an overhang.

Evaluation Example 2: Characteristics During High-Temperature Storage and Heat Exposure The cells of Examples 1 to 7 and Comparative Example 1 were charged to an upper limit voltage of 4.25 V at a constant current of 0.5 C and discharged to a cut-off voltage of 2.8 V at 0.02 C at 25° C. for initial charge and discharge. The initial charged and discharged battery cells were measured with respect to capacity retention (%), while stored at a high temperature of 60° C. for 150 days, and the results are shown in Table 2.

The cells of Examples 1 to 7 and Comparative Example 1 were evaluated with respect to heat exposure characteristics at 150° C. in a hot box, and the results are shown in Table 2. Here, "o" indicates "Voltage drop during heat exposure" does exist, and "X" indicates "Voltage drop during heat exposure" does not exist.

TABLE 2

| | High-temperature storage (capacity) | Voltage drop during heat exposure |
|---|---|---|
| Example 1 | 70% | ○ |
| Example 2 | 75% | ○ |
| Example 3 | 85% | ○ |
| Example 4 | 92% | X |
| Example 5 | 93% | X |
| Example 6 | 92% | X |
| Example 7 | 90% | X |
| Comparative Example 1 | 75% | X |

Referring to Table 2, the cells of Examples 1 to 7 secured high-temperature storage capacity of 70% or higher. In Examples 1 to 7, as each overhang length on (e.g., above) and under (e.g., below) each negative electrode in the transverse direction (TD) was longer, high-temperature storage capacity of the cell was increased or maintained. Furthermore, for each overhang length on (e.g., above) and under (e.g., below) each negative electrode in the transverse direction (TD) that was greater than or equal to 1.5 mm (i.e., Examples 4 to 6), the cells still do suppress or reduce a voltage drop while providing a large high-temperature storage capacity of 90% or higher during the heat exposure, unlike the cell of Comparative Example 1. For example, when each overhang length on (e.g., above) and under (e.g., below) each negative electrode in the transverse direction (TD) was 3 mm (i.e., Example 6), the cell exhibited significantly excellent or suitable high-temperature storage capacity and voltage drop-suppressing characteristics during the heat exposure.

Evaluation Example 3: Evaluation of Room-Temperature Cycle-Life and High-Temperature Cycle-Life Characteristic The cells of Examples 1 to 7 and Comparative Example 1 were constant current-charged to an upper limit voltage of 4.25 V at a constant current of 0.5 C and subsequently, cut off at a 0.02 C rate in the constant voltage mode, while maintaining the 4.25 V at room temperature (25° C.) and a high temperature (45° C.). Subsequently, the cells were discharged to a voltage of 2.8 V at a 0.5 C rate, and this charge and discharge cycle was 650 times repeated. Then, the cells were measured with respect to capacity and DC-IR according to the cycle numbers, and the results at room temperature are shown in Table 3.

TABLE 3

| | Room-temperature cycle-life (capacity/DC-IR) | High-temperature cycle-life (capacity/DC-IR) |
|---|---|---|
| Example 1 | 85% (130%) | 74% (196%) |
| Example 2 | 90% (125%) | 76% (192%) |
| Example 3 | 93% (110%) | 80% (189%) |
| Example 4 | 95% (115%) | 85% (180%) |
| Example 5 | 94% (112%) | 83% (183%) |
| Example 6 | 93% (113%) | 82% (182%) |
| Example 7 | 91% (115%) | 80% (185%) |
| Comparative Example 1 | 90% (123%) | 80% (190%) |

Referring to Table 3, the cells of Examples 1 to 7 secured room-temperature cycle-life of 85% or more and high-temperature cycle-life of 74% or more. For example, in the cells of Examples 1 to 7, as each overhang length on (e.g., above) and under (e.g., below) the negative electrodes in the transverse direction (TD) was longer, room-temperature cycle-life and high-temperature cycle-life of the cells were increased. Furthermore, when each overhang length on (e.g., above) and under (e.g., below) the negative electrodes in the transverse direction (TD) was 1.5 mm or more (i.e., Example 4 to 6), room-temperature cycle-life and high-temperature cycle-life of the cells were overall improved, compared with the cell of Comparative Example 1. In particular, when each overhang length on (e.g., above) and under (e.g., below) the negative electrodes in the transverse direction (TD) was 3 mm (i.e., Example 6), the cell exhibited significantly excellent or suitable room-temperature cycle-life and high-temperature cycle-life.

Evaluation Example 4: Design Capacity

The cells of Examples 1 to 7 and Comparative Example 1 were calculated with respect to design capacity, under the assumption of having the same J/R vertical lengths (separator vertical length) (reflecting 3 mm of overhang on (e.g., above) and under (e.g., below) negative electrode-positive electrode in the TD direction), and the results are shown in Table 4.

TABLE 4

| | Design capacity (Ah) |
|---|---|
| Example 1 | 7.20 |
| Example 2 | 7.04 |
| Example 3 | 6.88 |
| Example 4 | 6.72 |
| Example 5 | 6.56 |
| Example 6 | 6.40 |
| Example 7 | 6.24 |
| Comparative Example 1 | 6.72 |

In Table 4, the cells of Examples 1 to 7 secured design capacity of 6.24 Ah or higher. For example, in the cells of Examples 1 to 7, as each overhang length on (e.g., above) and under (e.g., below) the negative electrodes in the transverse direction (TD) was gradually longer, the design capacity tended to decrease. However, comprehensively considering the results of Evaluation Examples 1 to 4, a cell having excellent or suitable design capacity as well as excellent or suitable adherence, high-temperature storage, and heat exposure characteristics, and room-temperature cycle-life and high-temperature cycle-life characteristics needs to be designed.

In other words, in terms of the design capacity as well as adherence, high-temperature storage, heat exposure characteristics, and room-temperature cycle-life and high-temperature cycle-life characteristics, a cell needs to be designed like the cells of Examples 1 to 7 rather than the cell of Comparative Example 1.

Evaluation Example 5: Non-wound Defects

With respect to the cells manufactured in Examples 1 to 7 and Comparative Example 1, when the J/R assemblies were performed, the non-wound defects through X-ray were shown in Table 5. Here, "o" indicates "Non-wound defects" exist, and "X" indicates "Non-wound defects" do not exist.

TABLE 5

| | Non-wound defects |
|---|---|
| Example 1 | ○ |
| Example 2 | ○ |
| Example 3 | ○ |
| Example 4 | X |
| Example 5 | X |
| Example 6 | X |
| Example 7 | X |
| Comparative Example 1 | X |

As described above, the cells of Examples 1 to 7 exhibited excellent or suitable design capacity as well as excellent or suitable adherence, high-temperature storage and heat exposure characteristics, and room-temperature cycle-life and high-temperature cycle-life characteristics. However, when attention is paid to suppressing a micro short of positive and negative electrodes, whether or not there are non-wound defects shown in Table 5 may be considered. For example, when the non-wound defects exist, the micro short of the positive and negative electrodes may occur.

In this regard, when each overhang length on (e.g., above) and under (e.g., below) a negative electrode in the transverse direction (TD) is designed to be 1.5 mm or more (i.e., Examples 4 to 6), there may be an additional effect of suppressing the micro short of the positive electrode and the negative electrode.

Spatially relative terms, such as "under," "below," "above," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "under" or "below" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

As used herein, the term "and/or" includes any and all combinations of one or more of the associated listed items. Expressions such as "at least one of," "a plurality of," "one of," and other prepositional phrases, when preceding a list of elements, should be understood as including the disjunctive if written as a conjunctive list and vice versa. For example, the expressions "at least one of a, b, or c," "at least one of a, b, and/or c," "one selected from the group consisting of a, b, and c," "at least one selected from a, b, and c," "at least one from among a, b, and c," "one from among a, b, and c", "at least one of a to c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent deviations in measured or calculated values that would be recognized by those of ordinary skill in the art. "Substantially" as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially" may mean within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The portable device or vehicle, and/or the battery, e.g., a battery controller, and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

While this disclosure has been described in connection with what is presently considered to be practical example embodiments, it is to be understood that the present disclosure is not limited to the disclosed embodiments. In contrast, it is intended to cover one or more suitable modifications and equivalent arrangements included within the spirit and scope of the appended claims and equivalents thereof.

| Reference Numerals | |
|---|---|
| 110: electrode assembly | 112: negative electrode |
| 113: separator | 114: positive electrode |
| 120: adhesive layer | |

What is claimed is:

1. An electrode assembly, comprising:
an electrode, and
a separator,
wherein the electrode comprises
a current collector,
an electrode active material layer on the current collector, and
an adhesive layer coated across substantially an entire surface of the electrode active material layer, and
wherein the separator has a larger surface area than the adhesive layer of the electrode, and a surface of the separator opposing the adhesive layer of the electrode is divided into an adhesive region in contact with the adhesive layer of the electrode and an overhang region not in contact with the adhesive layer of the electrode; and
wherein the adhesive layer comprises acryl-based polymer particles and fluorine-based polymer particles.

2. The electrode assembly of claim 1, wherein
the adhesive layer has a thickness of about 1 μm to about 5 μm.

3. The electrode assembly of claim 1, wherein
a ratio of a thickness of the adhesive layer to a thickness of the electrode active material layer is 1:218 to 5:218.

4. The electrode assembly of claim 1, wherein the adhesive layer is a spray-coated film that is coated across substantially the entire surface of the electrode active material layer.

5. The electrode assembly of claim 1, wherein a weight ratio of the acryl-based polymer particles to the fluorine-based polymer particles is in a range of 75:25 to 50:50.

6. The electrode assembly of claim 1, wherein
a shape of the electrode assembly is a stack, a z-stack, a folded stack, or a jelly roll.

7. The electrode assembly of claim 6, wherein
the electrode assembly is the z-stack, in which two or more electrodes are present, and in which the separator is folded in a zigzag manner, the two or more electrodes are alternately inserted into a folded portion of the separator and stacked, and
a length of the overhang region at an outermost side of either a right or left side of a longitudinal direction of the separator satisfies Equation 4:

$$2*L_5 \leq L_6, \quad \text{Equation 4}$$

wherein, in Equation 4, $L_5$ is a longitudinal length of any one electrode of the two or more electrodes; and $L_6$ is a length of the overhang region at the outermost side of either the right or left side of the longitudinal direction of the separator; and
wherein the two or more electrodes comprise the electrode.

8. The electrode assembly of claim 1, wherein
the adhesive layer is coated in a form of dots on the electrode active material layer.

9. The electrode assembly of claim 8, wherein the dots have an individual size of 200 μm to 300 μm.

10. The electrode assembly of claim 1, wherein
a transverse direction length of the separator and a transverse direction length of the electrode satisfy Equation 1:

$$0 \text{ mm} \leq L_1 - L_2 \leq 9 \text{ mm, and} \quad \text{Equation 1}$$

wherein, in Equation 1: $L_1$ is the transverse direction length of the separator; and $L_2$ is the transverse direction length of the electrode; and
wherein the transverse direction length of the separator is longer than a width of the separator perpendicular to the transverse direction length.

11. The electrode assembly of claim 10, wherein
the electrode is a negative electrode, and
the transverse direction length of the separator and the transverse direction length of the electrode satisfy Equation 1-1:

$$0 \text{ mm} \leq L_1 - L_{21} \leq 6 \text{ mm, and} \quad \text{Equation 1-1}$$

wherein, in Equation 1-1: $L_1$ is the transverse direction length of the separator; and $L_{21}$ is the transverse direction length of the negative electrode.

12. The electrode assembly of claim 10, wherein
the electrode is a positive electrode, and
the transverse direction length of the separator and the transverse direction length of the electrode satisfy Equation 1-2:

$$3 \text{ mm} \leq L_1 - L_{22} \leq 9 \text{ mm, and} \quad \text{Equation 1-2}$$

wherein, in Equation 1-2: $L_1$ is the transverse direction length of the separator; and $L_{22}$ is the transverse direction length of the positive electrode.

13. The electrode assembly of claim 1, wherein in a transverse direction of the separator, lengths of the overhang region respectively above and below the electrode in the transverse direction satisfy Equations 2 and 3:

$$0\ \text{mm} \le L_3 \le 6\ \text{mm, and} \quad \text{Equation 2}$$

wherein, in Equation 2, $L_3$ is a length of the overhang region above the electrode in the transverse direction of the separator, and $$0\ \text{mm} \le L_4 \le 6\ \text{mm, and} \quad \text{Equation 3}$$

wherein, in Equation 3, $L_4$ is a length of the overhang region below the electrode in the transverse direction of the separator.

14. The electrode assembly of claim 13, wherein the electrode is a negative electrode, and the lengths of the overhang region satisfy Equations 2-1 and 3-1:

$$0\ \text{mm} \le L_{31} \le 3\ \text{mm, and} \quad \text{Equation 2-1}$$

wherein, in Equation 2-1, $L_{31}$ is the length of the overhang region above the electrode in the transverse direction of the separator, and $$0\ \text{mm} \le L_{41} \le 3\ \text{mm, and} \quad \text{Equation 3-1}$$

wherein, in Equation 3-1, $L_{41}$ is the length of the overhang region below the electrode in the transverse direction of the separator.

15. The electrode assembly of claim 13, wherein the electrode is a positive electrode, and the lengths of the overhang region satisfy Equations 2-2 and 3-2:

$$1.5\ \text{mm} \le L_{32} \le 4.5\ \text{mm, and} \quad \text{Equation 2-2}$$

wherein, in Equation 2-2, $L_{32}$ is the length of the overhang region above the electrode in the transverse direction of the separator, and $$1.5\ \text{mm} \le L_{42} \le 4.5\ \text{mm, and} \quad \text{Equation 3-2}$$

wherein, in Equation 3-2, $L_{42}$ is the length of the overhang region below the electrode in the transverse direction of the separator.

16. A rechargeable lithium battery, comprising the electrode assembly of claim 1; and an electrolyte.

17. An electrode assembly, comprising a positive electrode, a negative electrode, and a separator, wherein each of the positive electrode and the negative electrode comprises a current collector, an electrode active material layer on the current collector, and an adhesive layer coated across substantially an entire surface of the electrode active material layer; and wherein the separator has a larger surface area than the adhesive layer of one of the positive electrode or the negative electrode, and a surface of the separator opposite the adhesive layer of the one of the positive electrode or the negative electrode is divided into an adhesive region in contact with the adhesive layer of the one of the positive electrode or the negative electrode and an overhang region not in contact with the adhesive layer of the one of the positive electrode or the negative electrode; and wherein the adhesive layer comprises acryl-based polymer particles and fluorine-based polymer particles.

* * * * *